United States Patent

Ishikawa et al.

[11] Patent Number: 5,166,877
[45] Date of Patent: Nov. 24, 1992

[54] METHOD OF SPEED REDUCTION RATIO CONTROL IN CONTINUOUSLY VARIABLE SPEED TRANSMISSION

[75] Inventors: Yoshikazu Ishikawa, Saitama; Koji Sasajima, Tokyo, both of Japan

[73] Assignee: Honda Giken Kogyo Kabushiki Kaisha, Tokyo, Japan

[21] Appl. No.: 581,393

[22] Filed: Sep. 11, 1990

Related U.S. Application Data

[63] Continuation of Ser. No. 252,860, Sep. 30, 1988, abandoned.

[30] Foreign Application Priority Data

Oct. 2, 1987 [JP] Japan .................................. 62-249590
Nov. 5, 1987 [JP] Japan .................................. 62-279633

[51] Int. Cl.$^5$ ....................... F16H 61/46; G06F 15/50
[52] U.S. Cl. .................................... 364/424.1; 74/866
[58] Field of Search ................ 74/862, 863, 864, 866; 364/424.1

[56] References Cited

U.S. PATENT DOCUMENTS

| | | | |
|---|---|---|---|
| 4,023,442 | 5/1977 | Woods et al. ..................... | 74/863 |
| 4,170,153 | 10/1979 | Mizuno ............................. | 74/868 |
| 4,216,229 | 4/1981 | Mizuno ............................. | 74/866 |
| 4,253,347 | 3/1981 | Mizuno ............................. | 74/862 |
| 4,459,806 | 7/1984 | Falk ................................. | 60/327 |
| 4,509,125 | 4/1985 | Fattic ............................... | 364/424.1 |
| 4,515,040 | 5/1985 | Takeuchi et al. ................. | 74/866 |
| 4,584,907 | 4/1986 | Niwa et al. ....................... | 74/866 |
| 4,630,508 | 12/1986 | Klatt ................................. | 74/862 X |
| 4,646,520 | 3/1987 | Furumoto .......................... | 60/469 |
| 4,665,773 | 5/1987 | Hiramatsu ......................... | 74/866 |
| 4,671,138 | 6/1987 | Nobumoto et al. ............... | 74/862 |
| 4,699,025 | 10/1987 | Omitsu ............................. | 74/866 |
| 4,715,258 | 12/1987 | Shigematsu ....................... | 74/866 |
| 4,720,793 | 1/1988 | Watanabe et al. ................ | 364/424.1 |
| 4,729,103 | 3/1988 | Oshiage ............................. | 364/424.1 |
| 4,796,489 | 1/1989 | Nagamatsu et al. ............... | 74/868 |
| 4,846,019 | 7/1989 | Kumura ............................ | 74/864 |
| 4,893,526 | 1/1990 | Tokoro ............................. | 74/866 |
| 4,949,596 | 8/1990 | Iino et al. ......................... | 74/866 |

FOREIGN PATENT DOCUMENTS

| | | | |
|---|---|---|---|
| 0101151 | 2/1984 | European Pat. Off. . | |
| 0239365 | 9/1987 | European Pat. Off. . | |
| 0240178 | 10/1987 | European Pat. Off. . | |
| 55-14312 | 1/1980 | Japan . | |
| 56-95722 | 8/1981 | Japan . | |
| 8180864 | 10/1983 | Japan ............................... | 74/863 |
| 62-4640 | 1/1987 | Japan . | |
| 62-4641 | 1/1987 | Japan . | |
| 62-204052 | 9/1987 | Japan . | |
| 63-53343 | 3/1988 | Japan . | |
| 63-53344 | 3/1988 | Japan . | |
| 63-53345 | 3/1988 | Japan . | |
| 63-53346 | 3/1988 | Japan . | |
| 79/00036 | 2/1979 | PCT Int'l Appl. . | |

Primary Examiner—Dirk Wright
Attorney, Agent, or Firm—Lyon & Lyon

[57] ABSTRACT

A method of controlling speed reduction the following ratio of a continuously variable speed transmission using change rate di/dt of speed reduction ratio as control value.

$$di/dt = -C_1 * N/V^{2} * (dV_o/dt) + C_2 * 1/V * (dN_o/dt) + C_3 * N/V^{2} * (dV_o/dt - dV/Dt)$$

or, $$di/dt = -C_4 * (N/V^2) * dV_o/dt * K_{cl} + C_5 * (1/V) * dN_o/dt.$$

40 Claims, 8 Drawing Sheets

METHOD OF SPEED REDUCTION RATIO CONTROL IN CONTINUOUSLY VARIABLE SPEED TRANSMISSION

This is a continuation of co-pending application Ser. No. 252,860 filed on Sept. 30, 1988 now abandoned.

BACKGROUND OF THE INVENTION

This invention relates to a method for controlling a speed reduction ratio in a continuously variable speed transmission for a vehicle.

Therefor the following methods are known for speed control of a continuously variable speed transmission: selecting as a reference value either (a) the engine speed, (b) the rate of change of engine speed, or (c) the speed reduction ratio, and controlling the speed reduction ratio so as to follow the reference value.

These control methods, however, do not take the acceleration caused by the reserved power of the engine into account. As a result, the speed reduction ratio according to the known control methods tends to be larger or smaller than expected, thus at a low vehicle speed causing: (a) time-lag and unfavorable feeling produced by the time-lag (poor response) because of a small change rate of the speed reduction ratio during ratio control toward greater speed reduction ratio, (b) poor fuel consumption or unfavorable feelings accompanying an excessive increase of engine speed during ratio control toward smaller speed reduction ratio, (c) hunting of the engine speed because of a small change rate of the speed reduction ratio during ratio control toward greater speed reduction ratio, and (d) poor fuel consumption associated with poor efficiency due to excessive reduction of the speed reduction ratio during deceleration.

Therefore, the applicant proposed a method for solving these problems which comprises; calculating a change rate of speed reduction ratio by summing up a component corresponding to a predicted acceleration and a component corresponding to a reference change rate of the engine speed, and controlling speed reduction ratio based on the calculated change rate of speed reduction ratio (as exemplified by Japanese Patent laid-open Publications No. 63(1988)-53343 and No. 63(1988)-53344).

In the above control method, however, if the change rate of speed reduction ratio is calculated based on level road running, the actual engine speed will deviate from the reference engine speed because of a difference in running resistances during running on an ascending or a descending slope. More specifically, in the ascending slope situation the actual engine speed tends to be less than the reference speed, while in the descending slope situation the actual engine speed tends to be greater than the reference speed.

Many continuously variable speed transmissions employ clutch means which can control the transmission of engine power. In the partial engaging state of the clutch means, since the whole engine power is not directly transmitted to the transmission, such speed control as described above cannot be applied. For this reason, in the prior art, the speed control is divided into one for use "during clutch engagement" and the other for use "after clutch engagement completion". In an example of the clutch control, for instance, as disclosed in Japanese Patent laid-open Publication No. 56(1981)-95722, where clutch opening is controlled based on engine throttle opening, engine speed and vehicle speed.

But, in the case where the speed reduction ratio is controlled in the two stages, "during clutch engagement" and "after clutch engagement completion", it is difficult to smoothly shift the clutch engagement control stage to the post clutch engagement completion control stage and to smoothly start the speed reduction ratio control, because it is not easy to identify the exact time of clutch engagement completion, thus deteriorating driver's feeling. And, for the speed reduction ratio control, such a control has been employed as to set a reference engine speed corresponding to an accelerator opening and to make the engine speed follow the reference engine speed. But, if the determination of clutch engagement completion is inaccurate, the start of the speed reduction ratio control based on the reference engine speed may be delayed, thus resulting in momentary abrupt increase of the engine speed or insufficient feeling of acceleration.

SUMMARY OF THE INVENTION

It is an object of the present invention to provide a method for controlling speed reduction ratio in which a change rate of speed reduction ratio is calculated with such correction as to minimize the effect of the running resistance variations due to the ascending or descending slopes.

It is another object and purpose of the present invention to provide a method for controlling speed reduction ratio in which the control in the two stages (stage of "during clutch engagement control" and the stage of "after clutch engagement control" and the stage of "after clutch engagement completion") is continuously and smoothly performed.

The objects of the present invention are fulfilled by each of the following methods:

The first method includes, determining a predicted acceleration $dV_o/dt$ calculated from reserved power of the engine, a reference change rate $dN_o/dt$ of engine speed obtained based on a parameter representing driver's intention to accelerate or decelerate, an actual vehicle speed $V$, an actual acceleration $dV/dt$ and an actual engine speed $N$, computing a change rate $di/dt$ of speed reduction ratio by the following equation using the above values $$di/dt = -C_1*(N/V^2)*(dV_o/dt) + C_2*(1/V)*(dN_o/dt) + C_3*(N/V^2)*(dV_o/dt - dV/dt)$$

where, $C_1$, $C_2$ and $C_3$ are constants, and controlling the speed reduction ratio of a continuously variable speed transmission based on the above computed change rate $di/dt$. ("*" As used in the specification, an asterisk in a formula represents multiplication).

The second method includes; determining a predicted acceleration $dV_o/dt$ calculated from reserved power of the engine, a reference change rate $dN_o/dt$ of engine speed obtained based on a parameter representing driver's intention to accelerate or decelerate, an actual vehicle speed $V$, an actual engine speed $N$, and a transmission rate $KcL$ of engine power through a clutch, computing a change rate $di/dt$ of speed reduction ratio by the following equation using the above values $$di/dt = -C_4*(N/V^2)*(dV_o/dt)*Kcl + C_5*(1/V)*(dN_o/dt)$$

where, $C_4$ and $C_5$ are constants,
and controlling the speed reduction ratio of a continuously variable speed transmission based on the above computed change rate di/dt.

The further scope and applicability of the present invention will become apparent from the detailed description given hereinafter. However, it should be understood that the detailed description and specific examples, while indicating preferred embodiments of the invention, are given by way of illustration only, and various changes and modifications within the spirit and scope of the invention will become apparent to those skilled in the art from this detailed description.

DESCRIPTION OF THE DRAWINGS

The present invention will be more fully understood from the detailed description below and the accompanying drawings, which are given by way of illustration only, and thus do not limit the scope of the present invention, wherein.

DESCRIPTION OF THE PREFERRED EMBODIMENTS

Figure 1:
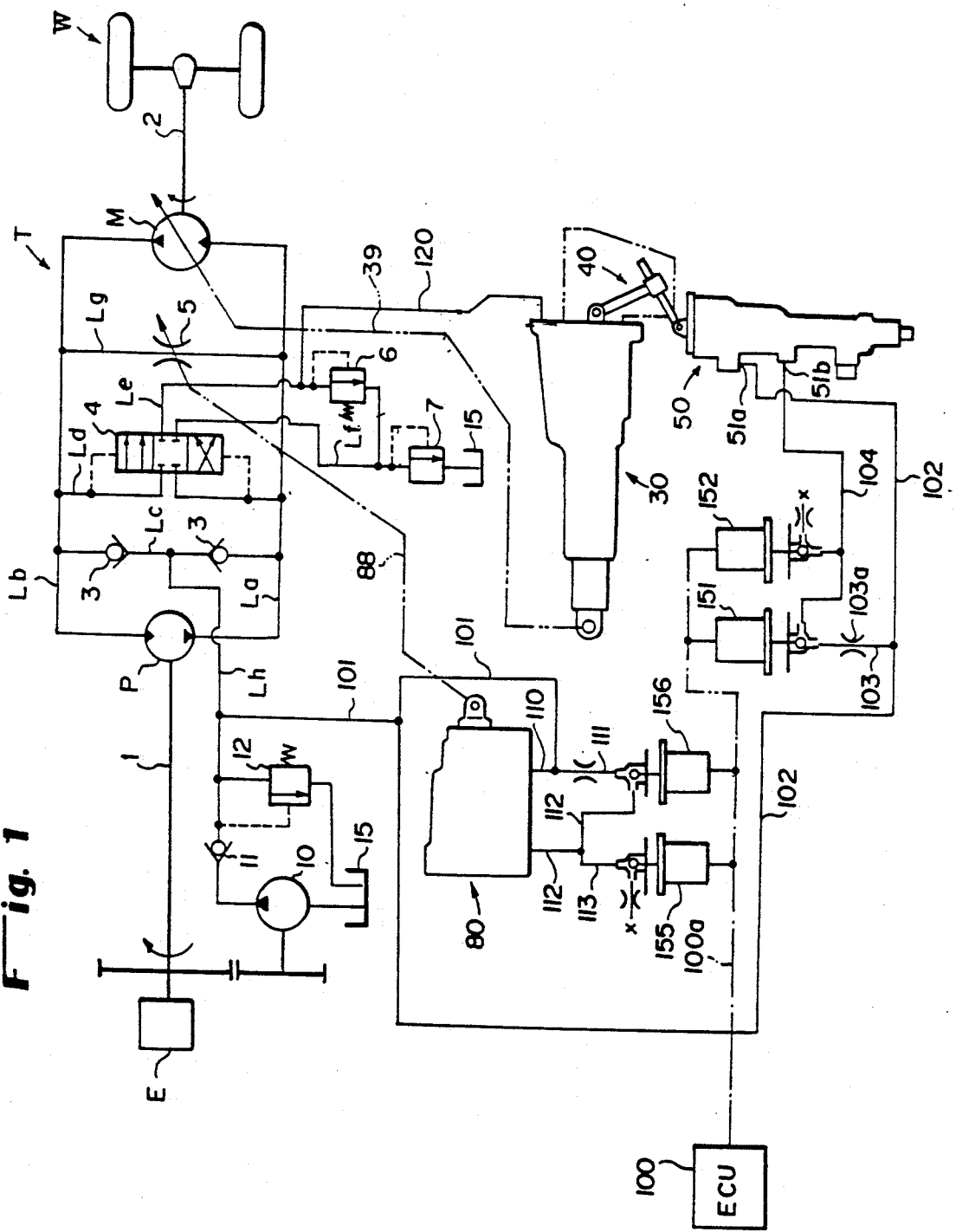
FIG. 1 is a hydraulic circuit diagram of a continuously variable speed transmission of which the speed reduction ratio is controlled by a method according to the instant invention.

FIG. 1 shows a hydraulic circuit diagram of a continuously variable speed transmission provided with a controller, according to the first embodiment of the present invention. The continuously variable speed transmission has a constant displacement hydraulic pump P driven by the engine E through the input shaft 1 and a variable displacement hydraulic motor M connected to the output shaft 2 driving the wheels W. The hydraulic pump P and motor M constitute a closed hydraulic circuit along with two hydraulic lines: the first hydraulic line La by which the delivery port of the pump P communicates with the suction port of the motor M, and the second hydraulic line Lb by which the suction port of the pump P does with the delivery port of the motor M.

A charge pump 10 driven by the engine E is connected to the closed circuit through a charge hydraulic line Lh having a check valve 11 and through a third hydraulic line Lc having a pair of check valves 3 and 3. Hydraulic oil pumped up by the charge pump 10 from an oil sump 15 and regulated in pressure by a charge pressure relief valve 12 is supplied to either of the two hydraulic lines La or Lb which has lower pressure through the check valves 3 and 3. And, a fourth hydraulic line Ld having a shuttle valve 4 is connected to the closed circuit. To the shuttle valve 4 is connected a fifth and a sixth hydraulic line which respectively have a high pressure relief valve 6 and a low pressure relief valve 7 and are connected to the oil sump 15. The shuttle valve 4 is a 2-port 3-position selector valve, which is operated in response to a hydraulic pressure difference of the first and second hydraulic lines to connect either of the first or second hydraulic lines La having higher pressure with the fifth hydraulic line Le as well as to connect the other having lower pressure to the sixth hydraulic line Lf. Therefore, the relief hydraulic pressure of a higher pressure-side line is regulated by the high pressure relief valve 6, and the relief hydraulic pressure of the other lower pressure-side line is regulated by the low pressure relief valve 7.

Between the first and the second hydraulic lines La and Lb is provided a seventh hydraulic line Lg through which the first and the second hydraulic lines can be communicated with each other. The seventh hydraulic line Lg is provided with a clutch valve 5, a flow metering valve to control the opening degree of the line Lg. The clutch valve 5 is actuated by a clutch servo unit 80 which is connected thereto through a link 88. Therefore, the flow metering control of the clutch valve 5 by the actuation of the clutch servo valve 80 can accomplish a clutch control for controlling transmission of driving power from the hydraulic pump P to the hydraulic motor M.

Actuators for controlling the speed reduction ratio of the continuously variable speed transmission T by way of the displacement control of the hydraulic motor M are the first and the second ratio control servo units 30 and 50 connected to one another by a link mechanism 40. The hydraulic motor M is a swash plate type axial piston motor whose displacement is varied by the control of swash plate angle by the ratio control servo units 30 and 50.

The actuations of the ratio control servo valves 30 and 50 as well and the clutch servo valve 80 are respectively controlled by pairs of solenoid valves 151, 152 and 155, 156 which are duty-ratio-controlled by signals from a controller 100. The controller 100 receives signals corresponding to such factors as vehicle speed V, engine speed Ne, throttle opening $\theta$th, swash plate angle $\theta$tr of the hydraulic motor M, accelerator pedal opening $\theta$acc operated by a driver, atmospheric pressure Pat, oil temperature To, water temperature Tw and clutch opening $\theta$cl. The controller 100, based on the above signals, outputs signals for controlling the above solenoid valves to effectuate desirable traveling control. Here, the engine throttle valve opening $\theta$th and the accelerator pedal opening $\theta$acc to actuate the engine throttle valve are parameters representing the driver's intention to accelerate or decelerate. The accelerator pedal opening $\theta$acc is "full-open" when the accelerator pedal is fully depressed, and "full-closed" when fully released.

The structures and operations of the above servo units 30, 50 and 80 are described in detail hereinafter.

Figure 2:
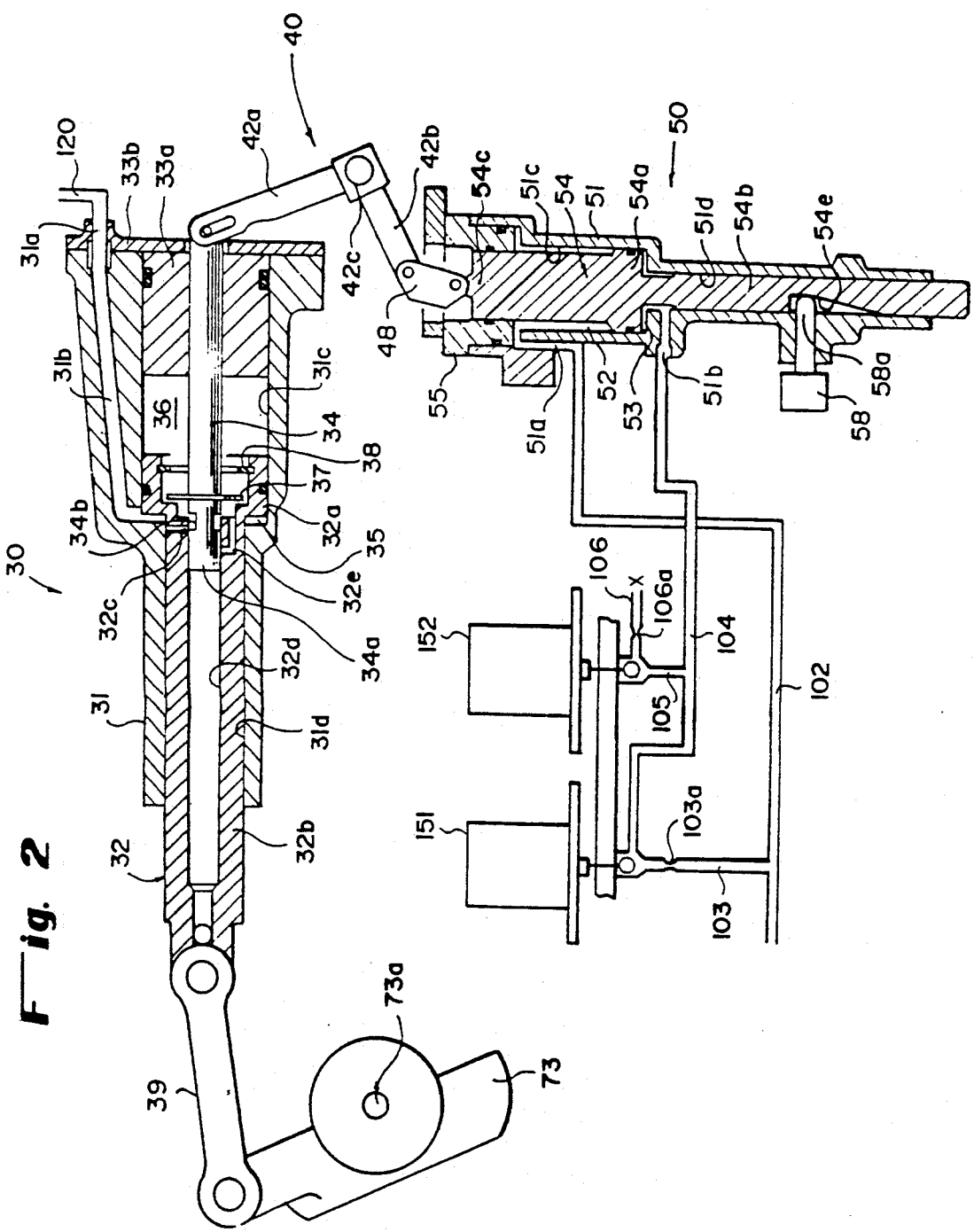
FIG. 2 is a cross sectional view of ratio control servo units of the aforesaid continuously variable speed transmission.

Referring first to the ratio control servo unit 30, 50 shown in FIGS. 1 and 2, the first ratio control servo unit 30 controls the swash plate angle of the hydraulic motor M by the help of the high hydraulic pressure fed from the closed hydraulic circuit of the transmission T through the shuttle valve 4, the fifth line Le and a high pressure line 120. The second ratio control servo unit 50 is connected to the first ratio control servo unit 30 by a link mechanism 40 and controls the operation of the first ratio control servo unit 30.

The first ratio control servo unit 30 comprises a housing 31 having a connection port 31a connected to the high pressure line 120, a piston member 32 slidably inserted into the housing 31, and a spool member 34 slidably and coaxially inserted into the piston member 32. The piston member 32 consists of a piston portion 32a formed at its right end and a rod portion 32b coaxially extending leftward. The piston portion 32a is fitted into a cylinder hole 31c of the housing 31 and divides the space inside the cylinder hole 31c into two chambers defining two cylinder chambers 35, 36. The rod portion 32b having a smaller diameter than that of the cylinder hole 31c is inserted into a rod hole 31d which is concentric with the cylinder hole 31c. The right cylinder chamber 36 is covered by a plug member 33a and cover 33b through which the right end of the spool member 34 protrudes.

The high pressure line 120 connected to the port 31a is communicated with the left cylinder chamber 35 through a hydraulic line 31b. The piston member 32 is pushed rightward by the hydraulic pressure fed in the left cylinder chamber 35 through the high pressure line 120.

A land portion 34a which is inserted in a spool hole 32d is formed at the left end of the spool member 34. A pair of dents 34b having diagonal planes with fixed axial widths is formed at the right side of the land portion 34a. A stop ring 37 mounted on the spool member 34 hits against a stop ring 38 mounted on the inside surface of the piston member 32 before the spool member 34 comes out.

A drain passage 32e which can connect the right cylinder chamber 36 to the oil sump (not shown) through the spool hole 32d responding to the rightward motion of the spool member 34 and a connection passage 32c which can connects the left cylinder chamber 35 to the right cylinder chamber 36 through the dents 34b responding to the leftward motion of the spool member 34 are formed in the piston member 32.

When the spool member 34 is moved rightward, the land portion 34a blocks the connection passage 32c and opens the drain passage 32e. Accordingly the hydraulic pressure fed through the high pressure line 120 is led in the left cylinder chamber 35 and pushes the piston member 32 rightward so that the piston member 32 follows the spool member 34. When the spool member 34 is moved leftward, the connection passage 32c communicates with the right cylinder chamber 36 through the dents 34b and the drain passage 32e is blocked by the land portion 34a. Accordingly the high hydraulic pressure is fed to both the left and right cylinder chambers 35, 36. The piston member 32 is pushed leftward because of the difference in areas where pressure is applied and therefore the piston member 32 is moved so as to follow the spool member 34.

When the spool member 34 is held still, the piston member 32 is also held still creating a hydraulic floating state because of pressure balance between the left and right cylinder chambers 35, 36.

As discussed, when the spool member 34 is moved leftward or rightward, the piston member 32 is moved laterally so as to follow the spool member 34 by the help of the high hydraulic pressure fed through the high pressure line 120. Accordingly the variable displacement of the motor M is controlled by the motion of the spool member 34 since the piston member 32 is connected to the swash plate 73 of the motor M by means of a link member 39.

The spool member 34 is linked to the second servo unit 50 by means of a link mechanism 40. The link mechanism 40 includes a first link member 42 being swingable around an axis 42c and having two arms 42a and 42b perpendicular to each other, and a second link member 48 pivotally connected to the arm 42b. The upper end of the arm 42a is pivotally connected to the right end of the spool member 34. The bottom end of the second link member 48 is pivotally connected to a spool member 54 of the second servo unit 50. Therefore when the spool member 54 of the second servo unit 50 is moved up or down, the spool member 34 of the first servo unit 30 is moved rightward or leftward.

The second servo unit 50 comprises a housing 51 having ports 51a, 51b to which hydraulic lines 102, 104 are connected respectively, and the spool member 54 vertically slidably fitted in the housing 51. The spool member 54 consists of a piston portion 54a, an end spool portion 54b coaxially extending downward and a rod portion 54c coaxially extending upward. The piston portion 54a is inserted into a cylinder hole 51c of the housing 51 and divides the space inside the cylinder hole 51c covered by a cover 55 into two chambers defining a rod-side (upper) and a head-side (lower) cylinder chamber 52, 53. The end spool portion 54b is fitted into a rod hole 51d which is concentric with the cylinder hole 51c and extends downward.

A spool 58a of a top position detecting switch 58 is projected into a recess 54e formed on the end spool portion 54b. The spool 58a is pushed up along the tapered surface of the recess 54e when the spool member 54 is moved up. Therefore it can be found by the top position detecting switch 58a if the speed reduction ratio has become minimum since the pushed-up spool 58a turns the switch 58 on.

Further, the hydraulic lines 102, 104 are communicated with the rod-side and head-side cylinder chambers 52, 53 through the ports 51a, 51b. The spool member 54 is moved up or down by the difference of hydraulic forces applied to the piston portion 54a which are determined based on the differences of hydraulic pressures and of areas where the hydraulic pressures in the cylinder chambers 52, 53 are applied. The up and down motions of the spool member 54 are transmitted to the spool member 34 of the first servo unit 30 by the link mechanism 40 causing left and right motions of the spool member 34. In other words, the control of the hydraulic pressures supplied through the hydraulic lines 102, 104 enables control of the motion of the spool member 34 and the piston member 32 in the first servo unit 30 and also enables control of the swash plate angle of the hydraulic motor M and the displacement thereof. Hence, when the spool member 54 of the second servo unit 50 is moved up, the piston member 32 of the first servo unit 30 is moved rightward lessening the swash plate angle, the displacement of the hydraulic motor M and the speed reduction ratio.

The pressurized oil in the hydraulic line 102 connecting the port 51a to the rod-side cylinder chamber 52 is sent through a hydraulic line 101 and 102 from the delivery line of the charge pump 10 after its pressure is regulated by the charge pressure relief valve 12. The oil pressure in the hydraulic line 104 connecting the port 51b to the head-side cylinder chamber 53 is obtained by regulating the oil pressure in a hydraulic line 103 (including an orifice 103a therein), which is branched from the hydraulic line 102, by the first and second duty-ratio-controlled solenoid valves 151 and 152. The first solenoid valve 151 duty-ratio-controls the flow rate of the oil flowing from the hydraulic line 103 (having the orifice 103a therein) to the hydraulic line 104. The second solenoid valve 152 is disposed between a hydraulic line 105 branched from the line 104 and a hydraulic line 106 communicating with the drain through an orifice 106a, and duty-ratio-controls drain-flow of the hydraulic oil from the line 104 in accordance with a given duty ratio.

As a result, to the rod-side cylinder chamber 52 a charge pressure regulated by the charged pressure relief valve 12 is applied through the line 102, while to the head-side cylinder chamber 53 is supplied from the line 104 a lower pressure than the charge pressure which is regulated by the first and second solenoid valves 151 and 152. Since the pressure applied area of the rod-side cylinder chamber 52 is smaller than that of the head-side cylinder chamber 53, the forces of oil pressures in the cylinder chambers 52 and 53 acting on the spool member 54 keep their balance when the oil pressure in the head-side cylinder chamber 53 is a specified value P1 which is smaller than the oil pressure Pu in the rod-side cylinder chamber 52 (Pu>P1). Therefore, when the oil pressure supplied into the head-side cylinder chamber 53 from the line 104 is controlled by the first and second solenoid valves 151 and 152 so as to be higher than the above pressure P1, the spool member 54 is moved upward to have a small swash plate angle of the hydraulic motor M, i.e., to have a small speed reduction ratio, while when the oil pressure supplied into the head-side cylinder chamber 53 from the line 104 is controlled so as to be smaller than the above pressure P1, the spool member 54 is moved downward to have a big swash plate angle of the hydraulic motor M, i.e., to have a big speed reduction ratio.

The solenoid valves 151 and 152 are controlled by signals from the controller 100: only by controlling the operations of the two solenoid valves 151 and 152 based on the signals from the controller 100, the actuations of the first and second ratio control servo units 30 and 50 are controlled, which results is the control of the displacement of the hydraulic motor M, in other words the control of speed reduction ratio.

Figure 3:
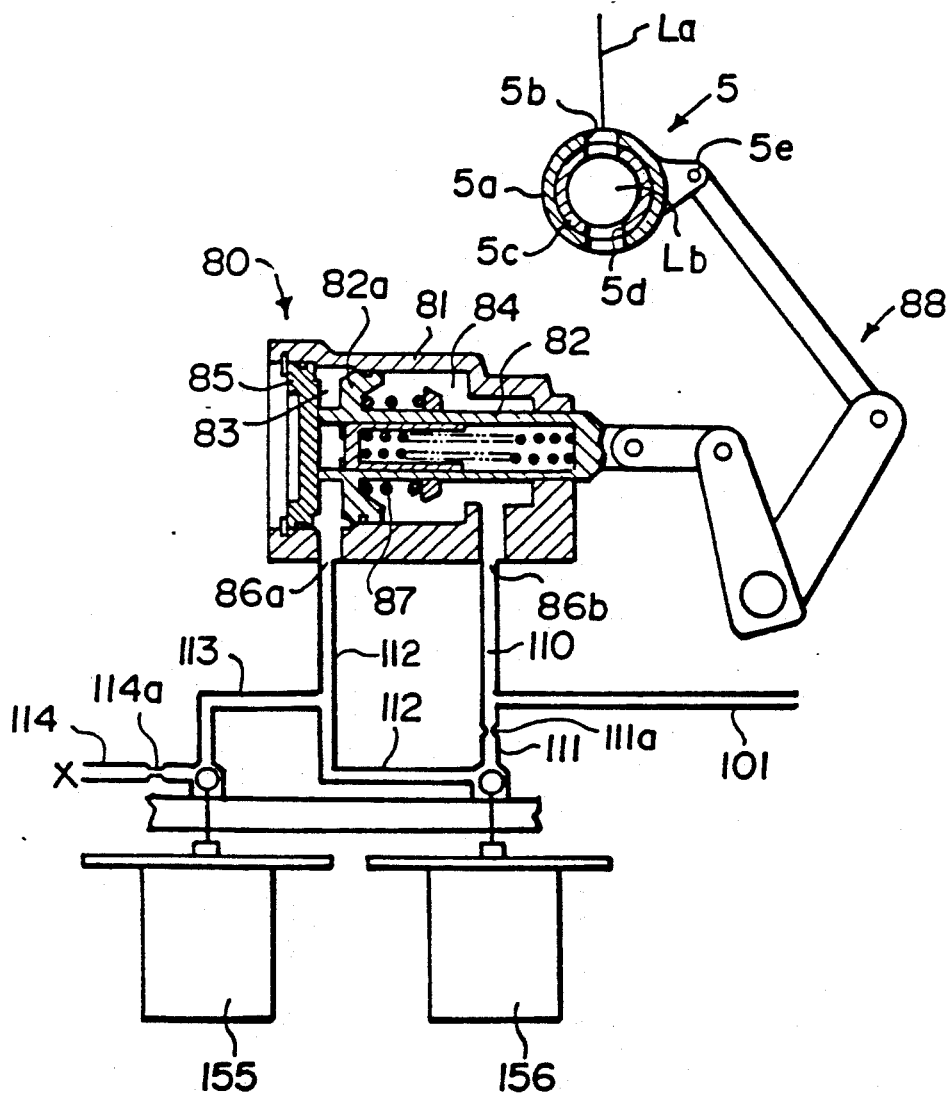
FIG. 3 is a cross sectional view of a clutch-control servo unit of the aforesaid continuously variable speed transmission.

The following is a detailed description of the construction of the clutch servo unit 80 based on FIG. 3. The clutch servo unit 80 consists of a cylinder member 81, a piston member 82 inserted in the cylinder member 81 slidably to the right and left on FIG. 3, a cover member 85 fixed to cover the cylinder chamber into which the piston member 82 is inserted, and a spring 87 pushing the piston member 82 to the left on FIG. 3. A piston 82a on the piston member 82 divides aforesaid cylinder member 81 into a head-side (left) cylinder chamber 83 and a rod-side (right) cylinder chamber 84 to which hydraulic lines 112 and 110 are respectively connected via respective ports 86a and 86b.

The hydraulic oil in the hydraulic line 110 is transferred from the charge pump 10 (whose delivery pressure is regulated by the charge pressure relief valve 12) through a hydraulic line 101, while the hydraulic oil in the hydraulic line 112 is transferred from the hydraulic line 101 through a hydraulic line 111. When the hydraulic oil is diveraged into the line 111 and passes through an orifice 111a in the line 111, hydraulic oil pressure is controlled by the two duty-ratio-controlled solenoid valves 155 and 156. Here, the solenoid valve 156 is provided to control the flow rate of the hydraulic oil flowing from the line 111 (having the orifice 111a therein) to the line 112 based on the duty ratio signals, while the solenoid valve 155 is disposed between a hydraulic line 113 diverging from the line 112 and a hydraulic line 114 communicating with the drain through an orifice 114a, to control the flow of the hydraulic oil from the line 113 to the drain based on the duty signals.

Therefore, to the rod-side cylinder chamber 84 via the line 110 is applied the charge pressure regulated by the charge pressure relief valve 12, while to the head-side cylinder chamber 83 is applied a pressure from the line 112 lower than the charge pressure, by the action of the aforesaid two solenoid valves 155 and 156. In this connection, the force applied on the piston member 82 from the right side (that is, a force due to the hydraulic pressure P1 in the rod-side cylinder chamber 84 plus the force of the spring 87) balances with the force applied on the piston member 82 from the left side (that is, a force due to the hydraulic pressure P2 in the head-side cylinder chamber 83), even when P2 is lower than P1, because the area of the rod-side cylinder chamber 84 subject to oil pressure is designed to be much smaller than that of the head-side cylinder chamber 83. Therefore, if the solenoid valves 155 and 156 control the hydraulic pressure (in the head-side cylinder chamber 83) supplied from the line 112 so as to be larger than the pressure P2, the piston member 82 will be moved to the right, while when the solenoid valves 155 and 156 control the hydraulic pressure in the head-side cylinder chamber 83 supplied from the line 112 so as to be smaller than the pressure P2, the piston member 82 will be moved to the left.

The movement of the piston member 82 to the left or right is transmitted to the clutch valve 5 through a link 88. The clutch valve 5 consists of a stationary member 5a having a first valve port 5b therein, and a rotary member 5c having a second valve port 5d rotatably inserted in the stationary member 5a. An arm 5e engaging with the rotary member 5c is connected to the aforesaid link 88, thus allowing a rotation of the rotary member 5c in accordance with the movement of the aforesaid piston member 82. When the rotary member 5c is rotated, the communication between the first and second valve ports 5b and 5d varies from "fully open" to "fully closed". When the piston member 82 is moved to the leftmost as shown in FIG. 3, the communication in the clutch valve 5 is "fully open", while as the piston member 82 moves to the right, the communication varies gradually to "fully closed".

Because the first valve port 5b communicates with the first line La and the second valve port 5d communicates with the second line Lb constituting the hydraulic closed-circuit, the variation in the communication between the aforesaid first and second valve ports 5b and 5d can change the opening degree of the seventh line Lg or the short circuit line of the first and second lines La and Lb, thus effecting clutch control. In other words, based on signal from the controller 100, duty-ratio control of the solenoid valves 155 and 156 can perform a successful clutch control.

With a continuously variable speed transmission having the above configuration, methods of ratio control and clutch control by way of the operational control of the solenoid valves are described.

Figure 4:
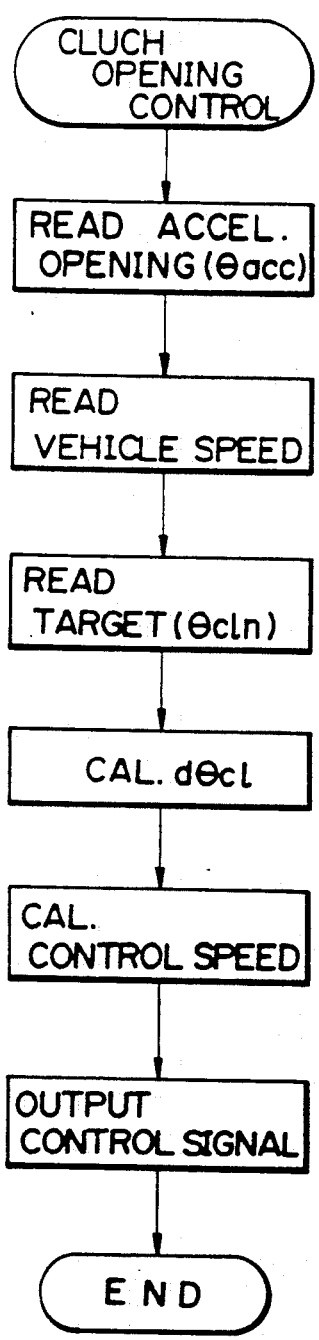
FIG. 4 is a flow chart showing clutch control.
Figure 5A:
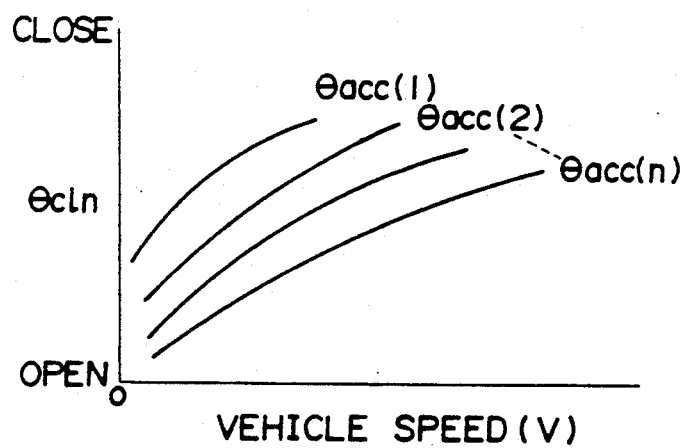
FIGS. 5A and 5B are graphs for obtaining a reference clutch opening and a clutch opening control speed respectively.

First, the clutch control is performed as shown in the flow chart in FIG. 4. This control starts with inputting accelerator pedal opening $\theta acc$ (or engine throttle opening $\theta th$) and vehicle speed V. Then a reference clutch opening $\theta cln$ is calculated based on the vehicle speed V and the accelerator pedal opening $\theta acc$. This calculation is made based on the graph shown in FIG. 5A representing reference clutch opening $\theta cln$ which is preset corresponding to vehicle speed V for each accelerator pedal opening $\theta acc(1)$, $\theta acc(2)$, ... $\theta acc(n)$ (where, $\theta acc(1)$ corresponds to the throttle "full-closed" and $\theta acc(n)$ corresponds to throttle "full-open"). The reference clutch opening $\theta cln$ varies in a range between 0 degrees and 90 degrees.

Figure 5B:
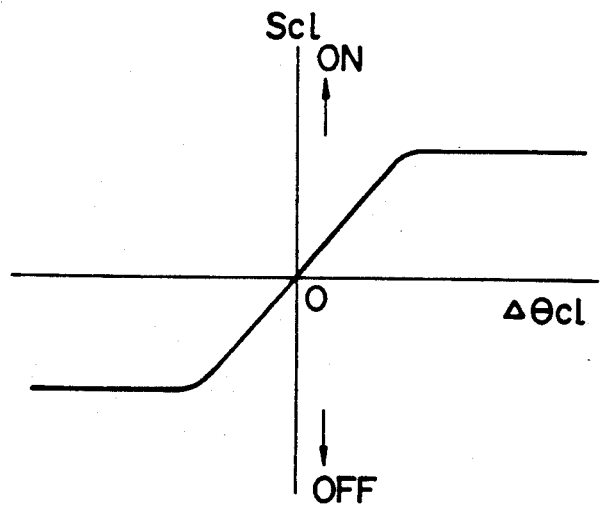

Then, the difference $d\theta cl$ (=$\theta clo - \theta cl$) between the reference clutch opening $\theta clo$ and the actual clutch opening $\theta cl$ is calculated, to obtain a clutch opening control speed Scl using the graph in FIG. 5B. The control speed Scl is, as apparent in FIG. 5B, given in the "clutch-engagement" direction (ON direction) to close the clutch valve when the difference $d\theta cl$ is positive, while it is given in the "clutch-disengagement" direction (OFF direction) to open the clutch valve when the difference $d\theta cl$ is negative. The speed Scl increases in proportion to the difference $d\theta cl$, but when the difference exceeds a given value, the control speed Scl tends essentially to a constant.

After the control speed Scl is obtained as described above, the controller 100 outputs command signals to the solenoid valves 155 and 156 so that the clutch valve 5 is actuated in accordance with the control speed Scl.

Next, ratio control associated with the first embodiment is described. First, the speed reduction ratio i (=input speed/output speed) is represented by equation (1):

$$i = N/(C' \cdot V) \tag{1}$$

where, N=engine speed, V=vehicle speed and C' is a constant. Differentiation of the equation (1) by time t gives the equation (2) for change rate of speed reduction ratio di/dt:

$$di/dt = 1/(CV) \cdot (dN/dt - N/(C' \cdot V) \cdot C' \cdot dV/dt) \tag{2}$$

In the equation (2), substitutions of a reference change rate $dNo/dt$ of engine speed for the change rate dN/dt of engine speed, a predicted acceleration $dV_o/dt$ for the acceleration dV/dt and 1/C for C' gives the equation (3):

$$di/dt = -C \cdot (N/V^2) \cdot dV_o/dt + C \cdot (1/V) \cdot dN_o/dt \tag{3}$$

As shown in the equation (3), the change rate di/dt of speed reduction ratio can be interpreted as the sum of a component dia/dt (= $-C \cdot N/V^2 \cdot dV_o/dt$) corresponding to the predicted acceleration $dV_o/dt$ and a component $di_N/dt$ (=$C \cdot 1/V^2 \cdot dN_o/dt$) corresponding to the reference change rate $dN_0/dt$ of engine speed.

The predicted acceleration $dV_0/dt$ is obtained from the following equations (4) to (7):

Output power Pe of the engine E (when transmission efficiency is assumed 100%) is given by the following equation (4);

$$Pe = Ru + Ra + Pa \tag{4}$$

where, Ru=running resistance, Ra=air resistance, Pa=reserved power of engine E.

From the equation (4), Pa is given by the following equation (5);

$$Pa = Pe - (Ru + Ra) \tag{5}$$

And, the reserved power can be given by the following equation (6) too;

$$Pa = (W + dW) \cdot (1/g) \cdot (dV_o/dt) \cdot (V \cdot 10^3)/60^2 \cdot (1/75) \tag{6}$$

where, W is total vehicle weight and dW is total engine rotational mass.

From the equations (6) and (5), the following equation (7) is given;

$$dV_o/dt = Pa \cdot g \cdot 60^2 / \{(w + dW) \cdot (V \cdot 10^3)\} \cdot 75 \tag{7}$$

Therefore, the predicted acceleration $dV_0/dt$ can be calculated from reserved power Pa of engine E, and the reserved power Pa can be obtained from the equation (5). On the other hand, the reference change rate $dN_o/dt$ of engine speed is determined by the following steps: calculating the difference dN between the reference engine speed $N_o$ and the actual engine speed N; and reading the reference change rate $dN_o/dt$ from a table in which the reference change rate $dN_0/dt$ is defined corresponding to aforesaid difference dN so as to obtain favorable running feeling and fuel consumption.

However, with regard to the change rate di/dt of speed reduction ratio thus obtained from the equation (3), the component (dia/dt) corresponding to the predicted acceleration $dV_0/dt$ is determined based on only the reserved power of engine E. The influences of running resistance in the ascending or descending slope are not taken into account. For this reason, when the speed reduction ratio is controlled based on the change rate di/dt of speed reduction ratio calculated by the equation (3), in the ascending slope the engine speed tends to fall under the reference speed because of increased running resistance, while in the descending slope it tends to rise over the reference speed because of decreased running resistance.

Such being the case, in this ratio control, aforesaid deviation from the reference speed is corrected using the difference between the predicted acceleration $dV_o/dt$ and the actual acceleration dV/dt: thus the change rate di/dt of speed reduction ratio is given by the following equation (8).

$$di/dt = -C_1 \cdot N/V^2 \cdot dV_o/dt + C_2 \cdot 1/V \cdot dN_o/dt + C_3 \cdot N/V^2 \cdot (dV_o/dt - dV/dt) \tag{8}$$

where, $C_1$, $C_2$ and $C_3$ are constants for weighting.

More particularly, the change rate di/dt of speed reduction ratio in the ratio control is calculated as the sum of the component dia/dt (= $-C_1 \cdot (N/V^2) \cdot dV_o/dt$) corresponding to the predicted acceleration $dV_o/dt$, the component $di_N/dt$ (=$C_2 \cdot (1/V) \cdot dN_o/dt$) corresponding to the reference change rate $dN_o/dt$ of engine speed, and the component $d(di/dt)(=C_3 * (N/V^2) * (dV_o/dt - dv/dt)$ for correction of predicted acceleration component corresponding to the variations of running resistance. At this time, weights on respective components can be adjusted for obtaining proper ratio control characteristics in accordance with actual vehicle running.

Figure 6:
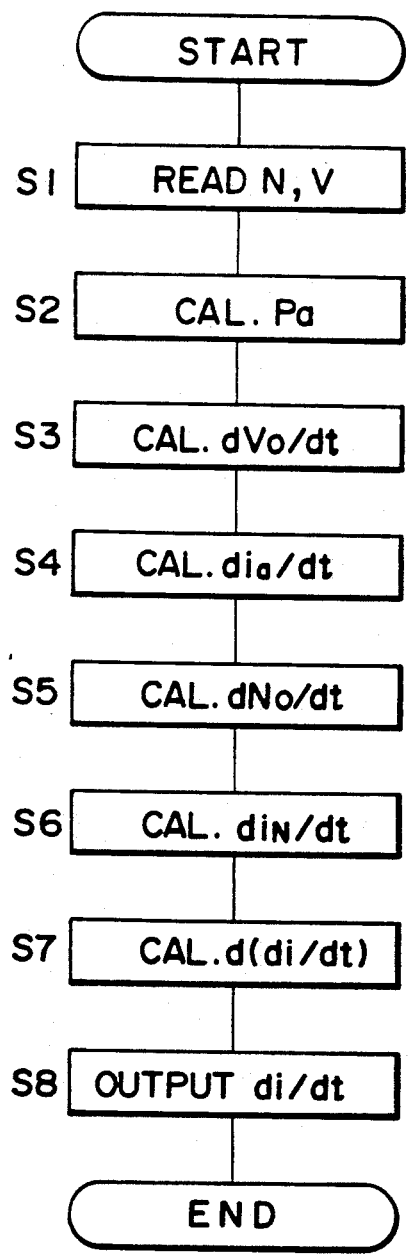
FIG. 6 is a flow chart showing speed reduction ratio control associated with the first embodiment of the instant invention.
Figure 7:
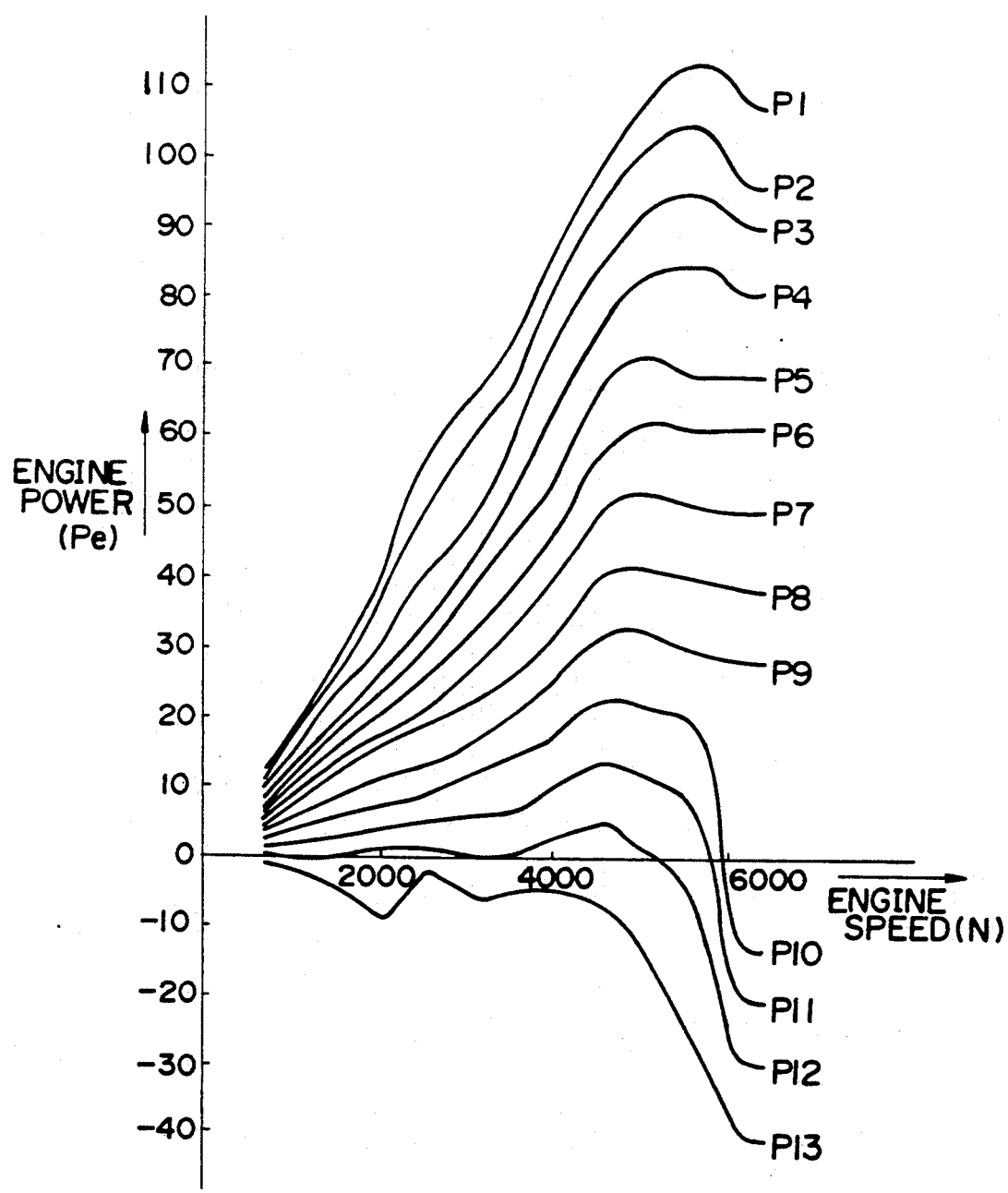
FIGS. 7 and 8 are graphs showing maps for obtaining engine power and reference change rate of the engine speed respectively.

Such calculation of the change rate $di/dt$ of speed reduction ratio as described above and the control of speed reduction ratio based on the computed change rate $di/dt$ is made by the controller 100. Here, the algorithm of the control is illustrated using the flow chart in FIG. 6:

First, in the first step S1, the engine speed N and the vehicle speed V are inputted into the controller 100. In the second step S2 is calculated the reserved engine power Pa. The calculation is performed based on the equation (5), while the engine output power Pe can be obtained from the map shown typically in FIG. 7, the abscissa represents the engine speed N, and the ordinate does the engine output power Pe, based on a plurality of vacuums $P_1$ to $P_{13}$ of intake air 13. In other words, the engine power Pe is obtained from the engine speed N and the vacuum pressure of intake air.

Here, the engine output power Pe thus obtained is determined without considering transmission efficiency. To calculate actual power transmitted to the wheels, it must be corrected by the product $E_{fM}$ of the speed reduction ratio coefficient (function of the speed reduction ratio i) and the transmission efficiency (function of the engine output power Pe and the engine speed N). For this reason, the reserved power Pa used in the second step S2 employs the corrected power obtained in FIG. 7 by said efficiency $E_{fM}$.

As described above, the reserved power Pa of the engine E actually applied to the wheels is calculated, which gives the predicted acceleration $dV_o/dt$ using the equation (7) in the third step S3. Then, in the fourth step S4, the predicted acceleration component $di_a/dt$ of the speed reduction ratio change rate is computed.

Figure 8:
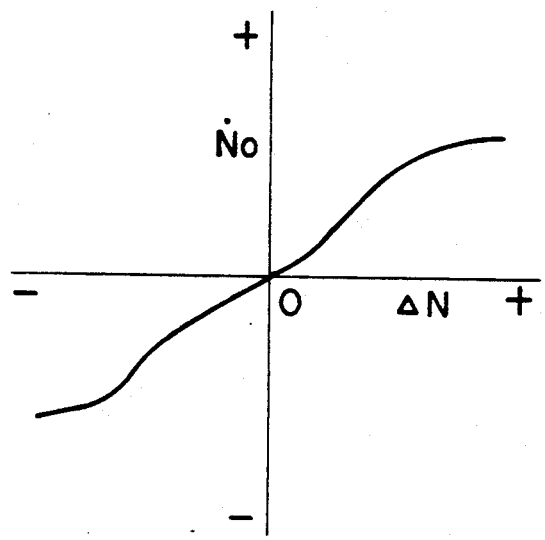

In the fifth step S5, the reference change rate $dN_0/dt$ of the engine speed is obtained: as shown in FIG. 8, the reference change rate $dN_o/dt$ is determined based on the speed difference dN between the reference engine speed $N_o$ and the actual engine speed N. In the sixth step S6, based on the reference change rate $dN_o/dt$, the component $di_N/dt$ of the change rate $di/dt$ of speed reduction ratio is obtained.

Figure 9:
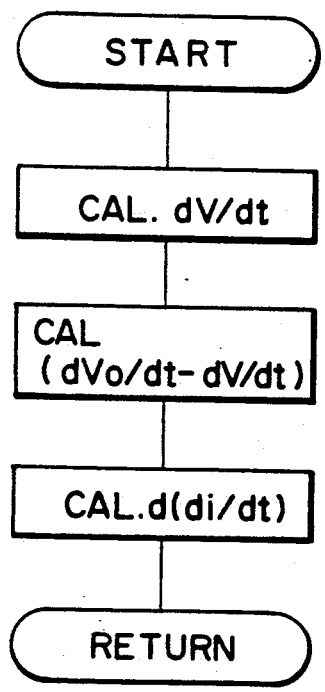
FIG. 9 is a flow chart showing a subroutine for obtaining the corrective component D(di/dt) in the above speed reduction ratio control.

Next, in the seventh step S7, the correction component $d(di/dt)$ of the predicted acceleration is obtained: subroutine in FIG. 9 shows the calculation. In the subroutine, the actual acceleration $dV/dt$ is calculated by differentiating the vehicle speed V, and the difference $(dV_o/dt - dV/dt)$ between the predicted acceleration and the actual acceleration is calculated. Then using the engine speed N, the vehicle speed V, and the weighting constant $C_3$ already established, the correction component $d(di/dt)$ is calculated from the above equation $C_3 * (N/V^2) * (dV_o/dt - dV/dt)$.

As described above, when all components $di/dt$, $di_N/dt$ and $d(di/dt)$ are calculated, in the eighth step S8, as shown in equation (8), these components are added to compute the change rate $di/dt$ of speed reduction ratio. Using this calculated value $di/dt$ as a control value, the controller 100 actuates and controls the solenoid valves 151 and 152.

The predicted acceleration $dV_o/dt$ obtained from the equation (7) based on the reserved output Pa is determined based on level road running. However, even when there are variations in running resistance due to ascending/descending, or exposure to tail wind/head wind, since the change rate $di/dt$ of speed reduction ration is corrected by the correction component $d(di/dt)$, this ratio control has hardly any possibility that the actual engine speed deviates from the reference engine speed.

Next, a ratio control as a second embodiment is described.

Regarding the change rate $di/dt$ of speed reduction ratio thus obtained from the equation (3), the component corresponding to the predicted acceleration $dV_o/dt$ is calculated from the reserved power of the engine, but the reserved power of engine is the one obtained when all of the engine output is directly transmitted to the transmission. Therefore, for example, when the engine power is partly transmitted through the clutch, the equation (3) cannot be used directly as it is.

Accordingly, in this control to calculate the component for the predicted acceleration using the engine power actually delivered to the transmission, the equation (3) is corrected by a transmission rate of the clutch $K_{CL}$ into the following equation (9) to obtain the change rate $di/dt$ of speed reduction ratio:

$$di/dt = -C_4 * N/V^2 * dV_o/dt * K_{CL} + C_5 * 1/V * dN_o/dt \qquad (9)$$

where, $C_4$ and $C_5$ are constants for weighting the two components.

Figure 10:
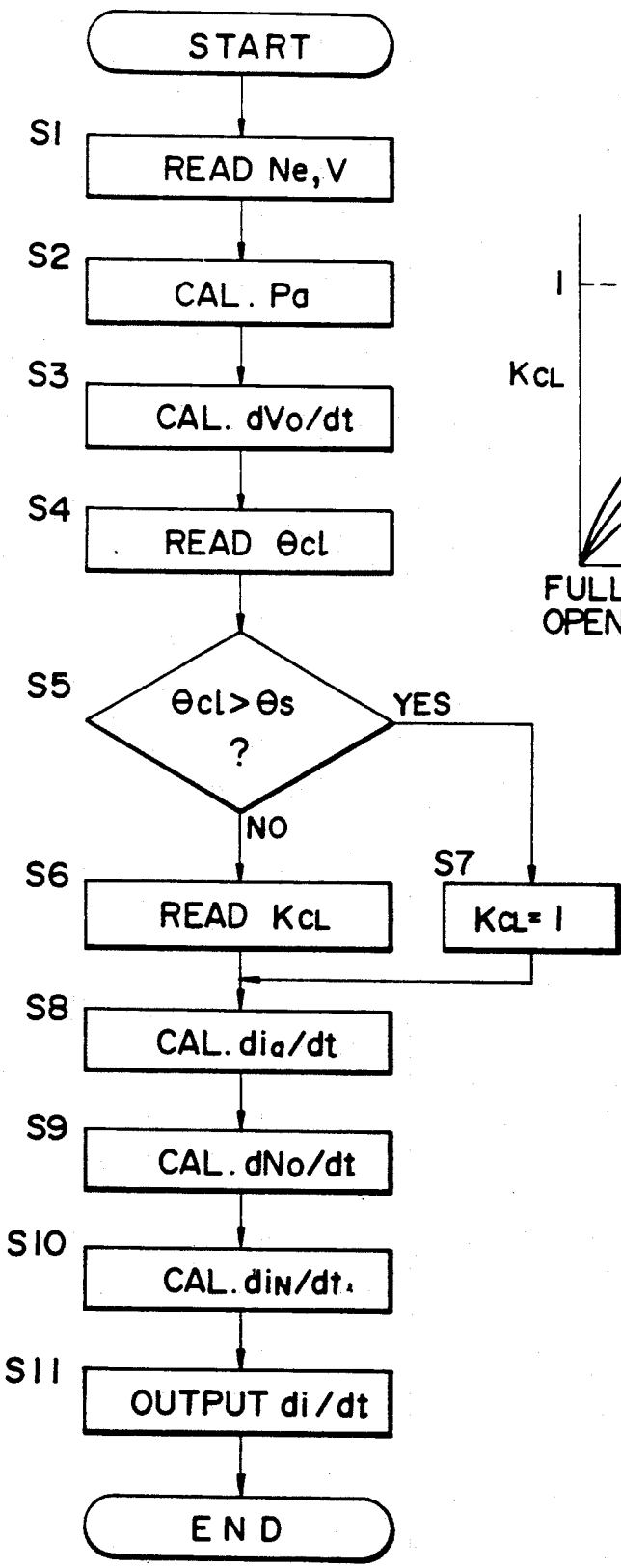
FIG. 10 is a flow chart illustrating speed reduction ratio control in the second embodiment of the instant invention.

The calculation of change rate $di/dt$ of speed reduction ratio described above and the control of speed reduction ratio based on thus computed change rate $di/dt$ of speed reduction ratio are performed by the controller 100. The control is detailed referring to the flow chart in FIG. 10:

First, in the first step S1, the engine speed Ne and the vehicle speed V is inputted to the controller 100, and in the second step S2 the reserved engine power Pa is calculated. The calculation of the reserved power Pa is performed using the equation (5). As in the first embodiment, the power Pe of the engine E itself is obtained from the predefined map for instance typically shown in FIG. 7. Further, the reserved power Pa calculated in the second step S2 is corrected by the aforesaid efficiency $E_{fM}$.

The reserved power Pa of the engine E is obtained as described above, and in the third step S3 predicted acceleration $dV_o/dt$ is obtained from the equation (7).

Figure 11:
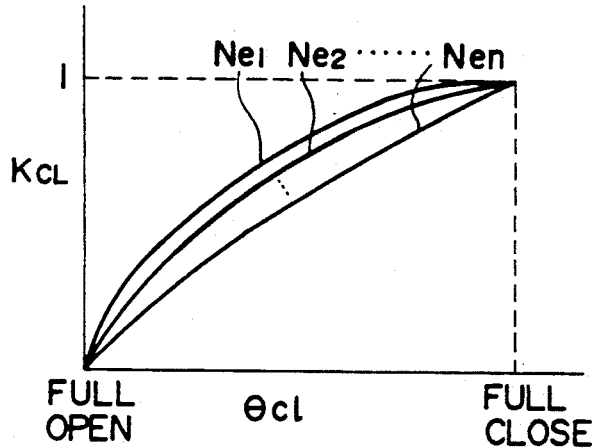
FIG. 11 is a graph showing a map for obtaining a transmission rate of the clutch.

Next, in the fourth step S4, clutch opening $\theta cl$ is inputted, and in the fifth step it is judged whether the clutch opening $\theta cl$ is larger than an opening $\theta s$ predetermined as a value close to "full-close" condition. In other words, whether the clutch opening $\theta cl$ is essentially fully closed is judged, and if $\theta cl > \theta s$, i.e., the clutch valve 5 is substantially fully closed, the transmission rate of the clutch $K_{CL}$ is set to 1. On the contrary, if $\theta cl < \theta s$, the step is advanced to the sixth step S6 to read the transmission rate $K_{CL}$ using FIG. 11. The transmission rate $K_{CL}$ has been predefined for the clutch opening $\theta cl$ corresponding to each engine speed $(Ne_1, Ne_2, \ldots Ne_n)$ as shown in the graph in FIG. 11. Therefore, using this graph, the transmission rate is obtained based on the engine speed Ne and the clutch opening $\theta cl$.

Next in the eighth step S8, using the transmission rate $K_{CL}$, the predicted acceleration component $dia/dt$ for the change rate $di/dt$ of speed reduction ratio is calculated from the following equation:

$$dia/dt = -C_4*(N/V^2)*(dV_o/dt)*K_{CL}$$

In the 9th step S9, the reference change rate $dN_o/dt$ of engine speed is obtained. As shown in FIG. 8, the reference change rate $dN_o/dt$ is predetermined for the difference $dN$ between the reference engine speed $N_o$ and the actual engine speed N, and the reference change rate $dN_o/dt$ is calculated based on the difference $dN$. In the tenth step S10, based on the reference change rate $dN_o/dt$, the component $di_N/dt$ for the change rate $di/dt$ of speed reduction ratio corresponding to the reference change rate $dN_o/dt$ of engine speed is calculated from the following equation:

$$di_N/dt = C_5*(1/V)*(dN_o/dt)$$

After the both components $dia/dt$ and $di_N/dt$ are calculated as described above, in the eleventh step S11, the both components are added to calculate the change rate $di/dt$ of speed reduction ratio as shown in the equation (9), and the controller 100 actuates and controls the solenoid valves 151 and 152 using the calculated value $di/dt$ as control value.

In the control used in the second embodiment, the change rate $di/dt$ of speed reduction ratio is calculated as the sum of the component $dia/dt$ ($=C_4*N/V^{2}*dV_o/dt * K_{CL}$) corresponding to predicted acceleration $dV_o/dt$, which is obtained based on the actual input power to the transmission and corrected by the transmission rate $K_{CL}$, and the component $di_N/dt$ ($=C_5* 1/V * dN_o/dt$) corresponding to the reference change rate $dN_o/dt$ of engine speed, and the ratio control is performed using the change rate $di/dt$ of speed reduction ratio calculated as described above. Therefore, both during clutch engaging and after clutch engagement completion, the ratio control can be performed based only on aforesaid change rate $di/dt$ of speed reduction ratio. As a result, the clutch engagment control condition is smoothly shifted to the clutch engagement completion condition, thus eliminating causes of unfavorable feelings during speed change, and a rapid increases of engine speed.

Here the embodiments are adapted for a continuously variable speed transmission having a hydraulic pump and a hydraulic motor, but the application of the control methods according to the invention are not limited to such a continuously variable speed transmission, but may include other types of continuously variable speed transmission. Further, as a control device of speed reduction ratio, not only such electrical-hydraulic type device as in the embodiments for controlling solenoid valves by an electrical controller but also a hydraulic device for producing oil pressure corresponding to throttle opening and a actuating servo units by the oil pressure may be used.

The invention being thus described, it will be obvious that the same may be varied in many ways. Such variations are not to be regarded as a departure from the spirit and scope of the invention, and all such modifications as would be apparent to one skilled in the art are intended to be included within the scope of the following claims.

What is claimed is:

1. A method for controlling a speed reduction ratio of a continuously variable speed transmission comprising the steps of:

determining a predicted acceleration $dV_o/dt$ calculated from a reserved power of engine, a reference change rate $dN_o/dt$ of an engine speed obtained based on a parameter representing a driver's intention to accelerate or decelerate, an actual vehicle speed V, an actual acceleration $dV/dt$, and an actual engine speed N, calculating a change rate $di/dt$ of speed reduction ratio by the following equation using the above values $$di/dt = -C_1*(N/V^2)*(dV_o/dt) + C_2*(1/V)*(dN_o/dt) + C_3*(N/V^2)*(dV_o/dt - dV/dt)$$

where $C_1$, $C_2$, and $C_3$ are constants, and
controlling the speed reduction ratio using said calculated change rate $di/dt$ of speed reduction ratio as a control value,
wherein said continuously variable speed transmission comprises a hydraulic pump driven by said engine and a hydraulic motor driven by hydraulic pressure from said hydraulic pump, and
a displacement of at least one of said hydraulic pump and hydraulic motor is variable and is controlled based on said change rate $di/dt$ of speed reduction ratio.

2. A method for controlling a speed reduction ratio of a continuously variable speed transmission comprising the steps of:

determining a predicted acceleration $dV_o/dt$ calculated from a reserved power of an engine, a reference change rate $dN_o/dt$ of an engine speed obtained based on a parameter representing a driver's intention to accelerate or decelerate, an actual vehicle speed V, an actual engine speed N, and a transmission rate $K_{CL}$ of engine power through a clutch, calculating a change rate $di/dt$ of speed reduction ratio by the following equation using the above values $$di/dt = -C_4*(N/V^2)*(dVo/dt)*K_{CL} + C_5*(1/V)*(dN_o/dt)$$

where, $C_4$ and $C_5$ are constants, and controlling the speed reduction ratio using said calculated change rate $di/dt$ of speed reduction ratio as a control value,
wherein said continuously variable speed transmission comprises a hydraulic pump driven by said engine and a hydraulic motor driven by hydraulic pressure from said hydraulic pump, and
a displacement of at least one of said hydraulic pump and hydraulic motor is variable and is controlled based on said change rate $di/dt$ of speed reduction ratio.

3. A method for controlling a speed reduction ratio of a continuously variable speed transmission in a vehicle with an engine, comprising the steps of determining an engine speed N, determining a vehicle speed V, determining a reserved engine power Pa, determining a predicted acceleration $dV_o/dt$ using the reserved engine power, determining a reference change rate of engine speed $dN_o/dt$, determining a vehicle acceleration $dV/dt$, calculating a change rate $di/dt$ of speed reduction ratio according to the relationship $$di/dt = -C_1*(N/V^2)*(dV_o/dt) + C_2*(1/V)*(dN_o/dt) + C_3*(N/V^2)*(dV_o/dt - dV/dt)$$

where $C_1$, $C_2$, and $C_3$ are constants, and controlling an actuator coupled to said continuously variable speed transmission in response to said calculated change rate $di/dt$ of speed reduction ratio.

4. A method for controlling a speed reduction ratio of a continuously variable speed transmission according to claim 3, wherein the reserved engine power Pa is calculated using the output power of said engine.

5. A method for controlling a speed reduction ratio of a continuously variable transmission in a vehicle with an engine operatively connected to said transmission, said transmission having a clutch, comprising the steps of determining an engine speed N, determining a vehicle speed V, determining a reserved power Pa of said engine, determining a predicted acceleration $dV_o/dt$ of said vehicle from said reserved power Pa of said engine, determining a transmission rate $K_{CL}$ of said clutch, determining a reference change rate $dN_o/dt$ of said engine speed, calculating a change rate $di/dt$ of speed reduction ratio according to the relationship $$di/dt = -C_4*(N/V^2)*(dV_o/dt)*K_{CL} + C_5*(1/V)*dN_o/dt$$

where $C_4$ and $C_5$ are constants, and controlling an actuator coupled to said continuously variable transmission in response to said calculated change rate $di/dt$ of speed reduction ratio.

6. A method for controlling a speed reduction ratio of a continuously variable speed transmission according to claim 5, wherein the reserved power Pa of said engine is calculated using the output power of said engine.

7. A method for controlling a speed reduction ratio of a continuously variable transmission according to claim 5, further comprising the steps of determining whether said clutch is substantially fully closed and if said clutch is substantially fully closed then setting said transmission rate $K_{CL}$ of said clutch to 1, but if said clutch is not substantially fully closed then determining said transmission rate $K_{CL}$ of said clutch according to an opening of said clutch and said engine speed.

8. A method for controlling a speed reduction ratio of a continuously variable transmission in a vehicle, said transmission being operatively connected to an engine, comprising the steps of calculating a time rate of change of speed reduction ratio as the sum of a first component corresponding to a predicted acceleration of said vehicle, a second component corresponding to a reference change rate of speed of said engine, and a third component corresponding to the variations of a running resistance of said vehicle, and controlling an actuator coupled to said continuously variable transmission in response to said calculated change rate of speed reduction ratio.

9. A method for controlling a speed reduction ratio of a continuously variable transmission in a vehicle, said transmission being operatively connected to an engine, comprising the steps of calculating a change rate of speed reduction ratio as the sum of a first component corresponding to a predicted acceleration of said vehicle, said first component being corrected for a transmission rate of a clutch of said continuously variable transmission, and a second component corresponding to a reference change rate of the speed of said engine, and controlling an actuator coupled to said continuously variable speed transmission in response to said calculated change rate of speed ratio.

10. A method of controlling a speed reduction ratio of a continuously variable transmission in a vehicle, said transmission being operatively connected to an engine, comprising the steps of determining a predicted acceleration of said vehicle based on a reserved power of said engine, determining a reference change rate of the speed of said engine, calculating a change rate of speed reduction ratio of said transmission as the sum of a first component corresponding to said predicted acceleration of said vehicle and a second component corresponding to said reference change rate of the speed of said engine, and controlling an actuator coupled to said continuously variable speed transmission in response to said calculated change rate of speed ratio.

11. A method for controlling a speed reduction ratio of a continuously variable speed transmission in a vehicle with an engine, comprising the steps of determining a reserved power of said engine, adjusting a time rate of change of said speed reduction ratio according to said reserved power, and controlling an actuator coupled to said continuously variable speed transmission in response to said time rate of change of said speed reduction ratio.

12. A method for controlling a speed reduction ratio of a continuously variable speed transmission in a vehicle with an engine, comprising the steps of determining a reserved power of said engine, determining a reference change rate of engine speed of said engine, adjusting the time rate of change of said speed reduction ratio according to said reserved power and said reference change rate of engine speed, and controlling an actuator coupled to said continuously variable speed transmission in response to said time rate of change of said speed reduction ratio.

13. A method for controlling a speed reduction ratio of a continuously variable speed transmission in a vehicle with an engine, comprising the steps of determining an engine speed N, determining a vehicle speed V, determining a reserved engine power Pa, determining a predicted acceleration $dV_o/dt$ using the reserved engine power, determining a reference change rate of engine speed $dN_o/dt$, calculating a change rate $di/dt$ of speed reduction ratio according to the relationship $$di/dt = -C_1*(N/V^2)*(dV_o/dt) + C_2*(1/V)*(dN_o/dt)$$

where $C_1$ and $C_2$ are constants, and controlling an actuator coupled to said continuously variable speed transmission in response to said calculated change rate $di/dt$ of speed reduction ratio.

14. A method for controlling a speed reduction ratio of a continuously variable transmission according to claim 13, further comprising the step of determining a vacuum of intake air of said engine, and wherein said reserved engine power is calculated using an output power of said engine and said output power of said engine is determined according to said engine speed and said vacuum of intake air of said engine.

15. A method for controlling a speed reduction ratio of a continuously variable speed transmission in a vehicle with an engine, comprising the steps of determining an engine speed N, determining a vehicle speed V, determining an output power of said engine, determining a predicted acceleration $dV_o/dt$ using the output power of said engine, determining a reference change rate of engine speed $dN_o/dt$, calculating a change rate $di/dt$ of speed reduction ratio according to the relationship $$di/dt = -C_1*(N/V^2)*(dV_o/dt) + C_2*(1/V)*(dN_o/dt)$$

where $C_1$ and $C_2$ are constants, and controlling an actuator coupled to said continuously variable speed transmission in response to said calculated change rate $di/dt$ of speed reduction ratio.

16. A method for controlling a speed reduction ratio of a continuously variable speed transmission in a vehicle with an engine, comprising the steps of determining a reserved power of said engine, determining an operating condition of said vehicle, adjusting the time rate of change of said speed reduction ratio according to said reserved power and said operating condition, and controlling an actuator coupled to said continuously variable speed transmission in response to said time rate of change of said speed reduction ratio.

17. A method for controlling a speed reduction ratio of a continuously variable speed transmission according to claim 16, wherein said operating condition is the speed of said engine.

18. A method for controlling a speed of an engine in a vehicle with a continuously variable transmission comprising the steps of determining the speed of said engine, determining the speed of said vehicle, determining a reference change rate of engine speed based on a driver's intention to accelerate or decelerate, determining a reserved power of said engine, and controlling an actuator coupled to said continuously variable speed transmission in response to of said transmission based on said reference change rate of engine speed and said reserved power of said engine to vary the speed of said engine.

19. A method for controlling a speed of an engine in a vehicle with a continuously variable transmission comprising the steps of determining the speed N of said engine, determining the speed V of said vehicle, determining a reference change rate $dN_o/dt$ of engine speed based on a driver's intention to accelerate or decelerate, determining a reserved power Pa of said engine, determining a predicted acceleration $dV_o/dt$ using the reserved power of said engine, calculating a change rate $di/dt$ of speed reduction ratio according to the relationship $$di/dt = -C_1*(N/V^2)*(dV_o/dt) + C_2*(1/V)*(dN_o/dt)$$

where $C_1$ and $C_2$ are constants, and controlling an actuator coupled to said continuously variable speed transmission in response to.

20. Apparatus for controlling a speed reduction ratio of a continuously variable speed transmission comprising
    means for determining a predicted acceleration $dV_o/dt$ calculated from a reserved power of engine, a reference change rate $dN_o/dt$ of an engine speed obtained based on a parameter representing a driver's intention to accelerate or decelerate, an actual vehicle speed V, an actual acceleration $dV/dt$, and an actual engine speed N,
    means for calculating a change rate $di/dt$ of speed reduction ratio by the following equation using the above values $$di/dt = -C_1*(N/V^2)*(dV_o/dt) + C_2*(1/V)*(dN_o/dt) + C_3*(N/V^2)*(dV_o/dt - dV/dt)$$

where $C_1$, $C_2$, and $C_3$ are constants, and
means for controlling the speed reduction ratio using said calculated change rate $di/dt$ of speed reduction ratio as a control value,
wherein said continuously variable speed transmission comprises a hydraulic pump driven by said engine and a hydraulic motor driven by hydraulic pressure from said hydraulic pump, and
a displacement of at least one of said hydraulic pump and hydraulic motor is variable and is controlled based on said change rate $di/dt$ of speed reduction ratio.

21. Apparatus for controlling a speed reduction ratio of a continuously variable speed transmission comprising
    means for determining a predicted acceleration $dV_o/dt$ calculated from a reserved power of an engine, a reference change rate $dN_o/dt$ of an engine speed obtained based on a parameter representing a driver's intention to accelerate or decelerate, an actual vehicle speed V, an actual engine speed N, and a transmission rate $K_{CL}$ of engine power through a clutch,
    means for calculating a change rate $di/dt$ of speed reduction ratio by the following equation using the above values $$di/dt = -C_4*(N/V^2)*(dV_o/dt)*K_{CL} + C_5*(1/V)*(dN_o/dt)$$

where, $C_4$ and $C_5$ are constants, and
means for controlling the speed reduction ratio using said calculated change rate $di/dt$ of speed reduction ratio as a control value,
wherein said continuously variable speed transmission comprises a hydraulic pump driven by said engine and a hydraulic motor driven by hydraulic pressure from said hydraulic pump, and
a displacement of at least one of said hydraulic pump and hydraulic motor is variable and is controlled based on said change rate $di/dt$ of speed reduction ratio.

22. Apparatus for controlling a speed reduction ratio of a continuously variable speed transmission in a vehicle with an engine, comprising
    means for determining an engine speed N,
    means for determining a vehicle speed V,
    means for determining a reserved engine power Pa,
    means for determining a predicted acceleration $dV_o/dt$ using the reserved engine power,
    means for determining a reference change rate of engine speed $dN_o/dt$,
    means for determining a vehicle acceleration $dV/dt$,
    means for calculating a change rate $di/dt$ of speed reduction ratio according to the relationship $$di/dt = -C_1*(N/V^2)*(dV_o/dt) + C_2*(1/V)*(dN_o/dt) + C_3*(N/V^2)*(dV_o/dt - dV/dt)$$

where $C_1$, $C_2$, and $C_3$ are constants, and
an actuator coupled to said continuously variable speed transmission, said actuator controlled in response to said change rate $di/dt$ of speed reduction ratio.

23. Apparatus for controlling a speed reduction ratio of a continuously variable speed transmission according to claim 22, wherein the reserved engine power Pa is calculated using the output power of said engine.

24. Apparatus for controlling a speed reduction ratio of a continuously variable transmission in a vehicle with an engine operatively connected to said transmission, said transmission having a clutch, comprising means for determining an engine speed N,
means for determining a vehicle speed V,
means for determining a reserved power Pa of said engine,
means for determining a predicted acceleration $dV_o/dt$ of said vehicle from said reserved power Pa of said engine,
means for determining a transmission rate $K_{CL}$ of said clutch,
means for determining a reference change rate $dN_o/dt$ of said engine speed,
means for calculating a change rate $di/dt$ of speed reduction ratio according to the relationship $$di/dt = -C_4*(N/V^2)*(dV_o/dt)*K_{CL} + C_5*(1/V)*dN_o/dt$$

where $C_4$ and $C_5$ are constants, and
an actuator coupled to said continuously variable speed transmission, said actuator controlled in response to said change rate $di/dt$ of speed reduction ratio.

25. Apparatus for controlling a speed reduction ratio of a continuously variable speed transmission according to claim 24, wherein the reserved power Pa of said engine is calculated using the output power of said engine.

26. Apparatus for controlling a speed reduction ratio of a continuously variable transmission according to claim 24, further comprising means for determining whether said clutch is substantially fully closed and
means, if said clutch is substantially fully closed, for then setting said transmission rate $K_{CL}$ of said clutch to 1, but if said clutch is not substantially fully closed, then for determining said transmission rate of said clutch according to an opening of said clutch and said engine speed.

27. Apparatus for controlling a speed reduction ratio of a continuously variable transmission in a vehicle, said transmission being operatively connected to an engine, comprising means for calculating a time rate of change of speed reduction ratio as the sum of a first component corresponding to a predicted acceleration of said vehicle, a second component corresponding to a reference change rate of the speed of said engine, and a third component corresponding to the variations of a running resistance of said vehicle, and
an actuator coupled to said continuously variable speed transmission, said actuator controlled in response to said change rate $di/dt$ of speed reduction ratio.

28. Apparatus for controlling a speed reduction ratio of a continuously variable transmission in a vehicle, said transmission being operatively connected to an engine, comprising means for calculating a change rate of speed reduction ratio as the sum of a first component corresponding to a predicted acceleration of said vehicle, said first component being corrected for a transmission rate of a clutch of said continuously variable transmission, and a second component corresponding to a reference change rate of the speed of said engine, and
an actuator coupled to said continuously variable speed transmission, said actuator controlled in response to said change rate of speed ratio.

29. Apparatus of controlling a speed reduction ratio of a continuously variable transmission in a vehicle, said transmission being operatively connected to an engine, comprising means for determining a predicted acceleration of said vehicle based on a reserved power of said engine,
means for determining a reference change rate of the speed of said engine,
means for calculating a change rate of speed reduction ratio of said transmission as the sum of a first component corresponding to said predicted acceleration of said vehicle and a second component corresponding to said reference change rate of the speed of said engine, and
an actuator coupled to said continuously variable speed transmission, said actuator controlled in response to said change rate of speed ratio.

30. Apparatus for controlling a speed reduction ratio of a continuously variable speed transmission in a vehicle with an engine, comprising means for determining a reserved power of said engine,
means for adjusting a time rate of change of said speed reduction ratio according to said reserved power, and
an actuator coupled to said continuously variable speed transmission, said actuator controlled in response to said time rate of change of said speed reduction ratio.

31. Apparatus for controlling a speed reduction ratio of a continuously variable speed transmission in a vehicle with an engine, comprising means for determining a reserved power of said engine,
means for determining a reference change rate of engine speed of said engine,
means for adjusting the time rate of change of said speed reduction ratio according to said reserved power and said reference change rate of engine speed, and
an actuator coupled to said continuously variable speed transmission, said actuator controlled in response to said time rate of change of said speed reduction ratio.

32. Apparatus for controlling a speed reduction ratio of a continuously variable speed transmission in a vehicle with an engine, comprising means for determining an engine speed N,
means for determining a vehicle speed V,
means for determining a reserved engine power Pa,
means for determining a predicted acceleration $dV_o/dt$ using the reserved engine power,
means for determining a reference change rate of engine speed $dN_o/dt$,
means for calculating a change rate $di/dt$ of speed reduction ratio according to the relationship $$di/dt = -C_1*(N/V^2)*(dV_o/dt) + C_2*(1/V)*(dN_o/dt)$$

where $C_1$ and $C_2$ are constants, and an actuator coupled to said continuously variable speed transmission, said actuator controlled in response to said change rate di/dt of speed reduction ratio.

33. Apparatus for controlling a speed reduction ratio of a continuously variable transmission according to claim 36, further comprising
 means for determining a vacuum of intake air of said engine,
 wherein said reserved engine power is calculated using an output power of said engine and said output power of said engine is determined according to said engine speed and said vacuum of intake air of said engine.

34. Apparatus for controlling a speed reduction ratio of a continuously variable speed transmission in a vehicle with an engine, comprising
 means for determining an engine speed N,
 means for determining a vehicle speed V,
 means for determining an output power of said engine,
 means for determining a predicted acceleration $dV_o/dt$ using the output power of said engine,
 means for determining a reference change rate of engine speed $dN_o/dt$,
 means for calculating a change rate di/dt of speed reduction ratio according to the relationship $$di/dt = -C_1*(N/V^2)*(dV_o/dt) + C_2*(1/V)*(dN_o/dt)$$

where $C_1$ and $C_2$ are constants, and
 an actuator coupled to said continuously variable speed transmission, said actuator controlled in response to said change rate di/dt of speed reduction ratio.

35. Apparatus for controlling a speed reduction ratio of a continuously variable speed transmission in a vehicle with an engine, comprising
 means for determining a reserved power of said engine,
 means for determining an operating condition of said vehicle,
 means for adjusting the time rate of change of said speed reduction ratio according to said reserved power and said operating condition, and
 an actuator coupled to said continuously variable speed transmission, said actuator controlled in response to said time rate of change of said speed reduction ratio.

36. Apparatus for controlling a speed reduction ratio of a continuously variable speed transmission according to claim 35, wherein said operating condition is the speed of said engine.

37. Apparatus for controlling a speed of an engine in a vehicle with a continuously variable transmission comprising
 means for determining the speed of said engine,
 means for determining the speed of said vehicle,
 means for determining a reference change rate of engine speed based on a driver's intention to accelerate or decelerate,
 means for determining a reserved power of said engine, and
 means for controlling the speed reduction ratio of said transmission based on said reference change rate of engine speed and said reserved power of said engine to vary the speed of said engine,
 an actuator coupled to said continuously variable speed transmission, said actuator controlled in response to said speed reduction ratio.

38. Apparatus for controlling a speed of an engine in a vehicle with a continuously variable transmission comprising
 means for determining the speed N of said engine,
 means for determining the speed V of said vehicle,
 means for determining a reference change rate $dN_o/dt$ of engine speed based on a driver's intention to accelerate or decelerate,
 means for determining a reserved power Pa of said engine,
 means for determining a predicted acceleration $dV_o/dt$ using the reserved power of said engine,
 means for calculating a change rate di/dt of speed reduction ratio according to the relationship $$di/dt = -C_1*(N/V^2)*(dV_o/dt) + C_2*(1/V)*(dN_o/dt)$$

where $C_1$ and $C_2$ are constants, and
 an actuator coupled to said continuously variable speed transmission for controlling the speed of said engine by controlling the speed reduction ratio of said transmission using said calculated change rate di/dt of speed reduction ratio as a control value.

39. Apparatus for controlling a speed reduction ratio of a continuously variable speed transmission comprising
 means for determining a predicted acceleration $dV_o/dt$ calculated from a reserved power of engine, a reference change rate $dN_o/dt$ of an engine speed obtained based on a parameter representing a driver's intention to accelerate or decelerate, an actual vehicle speed V, an actual acceleration dV/dt, and an actual engine speed N,
 means for calculating a change rate di/dt of speed reduction ratio by the following equation using the above values $$di/dt = -C_1*(N/V^2)*(dV_o/dt) + C_2*(1/V)*(dN_o/dt) + C_3*(N/V^2)*(dV_o/dt - dV/dt)$$

where $C_1$, $C_2$, and $C_3$ are constants, and
 an actuator coupled to said continuously variable speed transmission, said actuator controlled in response to said change rate di/dt of speed reduction ratio.

40. Apparatus as in claim 39, wherein said actuator comprises a hydraulic pump.

* * * * *